(12) United States Patent
Nahar et al.

(10) Patent No.: US 12,269,450 B2
(45) Date of Patent: Apr. 8, 2025

(54) PARK BRAKE CONTROLLER WITH MULTIPLE COMMUNICATION CHANNELS AND FAILSAFE METHODS FOR USE THEREWITH

(71) Applicant: Bendix Commercial Vehicle Systems LLC, Avon, OH (US)

(72) Inventors: Amit Babalal Nahar, Maharashtra (IN); Akshay Mishra, Uttar Pradesh (IN); Jeswanth Samayamantula, Avon Lake, OH (US); Thomas J. Hayes, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 46 days.

(21) Appl. No.: 18/511,002

(22) Filed: Nov. 16, 2023

(65) Prior Publication Data
US 2025/0074387 A1 Mar. 6, 2025

(30) Foreign Application Priority Data
Aug. 30, 2023 (IN) .............................. 202341058220

(51) Int. Cl.
*B60T 17/22* (2006.01)
(52) U.S. Cl.
CPC ....... *B60T 17/221* (2013.01); *B60T 2270/413* (2013.01)

(58) Field of Classification Search
CPC ......................... B60T 17/221; B60T 2270/413
See application file for complete search history.

(56) References Cited

U.S. PATENT DOCUMENTS

| | | | |
|---|---|---|---|
| 2013/0282249 A1* | 10/2013 | Heise | B60T 13/746 701/70 |
| 2018/0086321 A1* | 3/2018 | Zula | H01H 19/46 |
| 2018/0086322 A1* | 3/2018 | Zula | B60K 35/22 |
| 2018/0131539 A1* | 5/2018 | Michel | B60R 16/0231 |
| 2018/0297563 A1* | 10/2018 | Cahill | B60T 8/1703 |
| 2019/0193707 A1* | 6/2019 | Deljosevic | B60T 7/105 |

FOREIGN PATENT DOCUMENTS

| | | |
|---|---|---|
| CN | 106302064 B | 3/2019 |
| CN | 110601945 A | 12/2019 |

\* cited by examiner

*Primary Examiner* — Sizo B Vilakazi
(74) *Attorney, Agent, or Firm* — Crowell & Moring LLP

(57) ABSTRACT

A park brake controller with multiple communication channels and failsafe methods for use therewith are provided. In one embodiment, a park brake controller is provided comprising a plurality of transceivers. In response to at least one of the plurality of transceivers not being able to receive, from a communication network in a vehicle, a park brake request and vehicle sensor data, the park brake request and vehicle sensor data are sent in a different, more-robust form to be received by another one of the plurality of transceivers. Other embodiments are provided.

20 Claims, 3 Drawing Sheets

PARK BRAKE CONTROLLER WITH MULTIPLE COMMUNICATION CHANNELS AND FAILSAFE METHODS FOR USE THEREWITH

CROSS-REFERENCE TO RELATED APPLICATION

This application claims priority to Indian Provisional Patent Application No. 202341058220, filed Aug. 30, 2023, which is hereby incorporated by reference.

BACKGROUND

Some heavy-duty commercial vehicles configured for towing a trailer use a park brake controller that is configured to engage and disengage a parking brake in response to a request from a human or virtual driver.

SUMMARY

The following embodiments generally relate to a park brake controller with multiple communication channels and failsafe methods for use therewith. In one embodiment, a park brake controller is provided comprising: a first transceiver that, when functional, is configured to receive, via a first communication channel coupled with a communication network, a park brake request and sensor data from at least one sensor of a vehicle; a second transceiver that, when functional, is configured to receive, via a second communication channel coupled with the communication network, the park brake request and the sensor data; and first and second processors respectively coupled with the first and second transceivers. When the first and second transceivers are functional, the first and second processors are configured to independently confirm whether the park brake request should be executed based on the sensor data. When only one of the first and second transceivers is functional, a one of the first and second processors associated with the functional transceiver is configured to perform a failsafe operation to increase confidence in its decision as to whether the park brake request should be executed based on the sensor data.

In another embodiment, a park brake controller is provided comprising: a plurality of transceivers; at least one processor coupled with the plurality of transceivers; a non-transitory computer-readable medium, and program instructions stored on the non-transitory computer-readable medium. When executed by the at least one processor, the program instructions cause the at least one processor to: in response to at least one of the plurality of transceivers not being able to receive, from a communication network in a vehicle, a park brake request and vehicle sensor data, cause the park brake request and vehicle sensor data to be received in a different form by another one of the plurality of transceivers.

In yet another embodiment, a method is provided that is performed in a park brake controller comprising first and second transceivers. The method comprises: determining that the first transceiver is not functional; in response to determining that the first transceiver is not functional, causing an increase in robustness of a park brake request and vehicle sensor data received by the second transceiver; and determining whether or not to execute the park brake request based on the vehicle sensor data.

Other embodiments are possible, and each of the embodiments can be used alone or together in combination.

DETAILED DESCRIPTION

Figure 1:
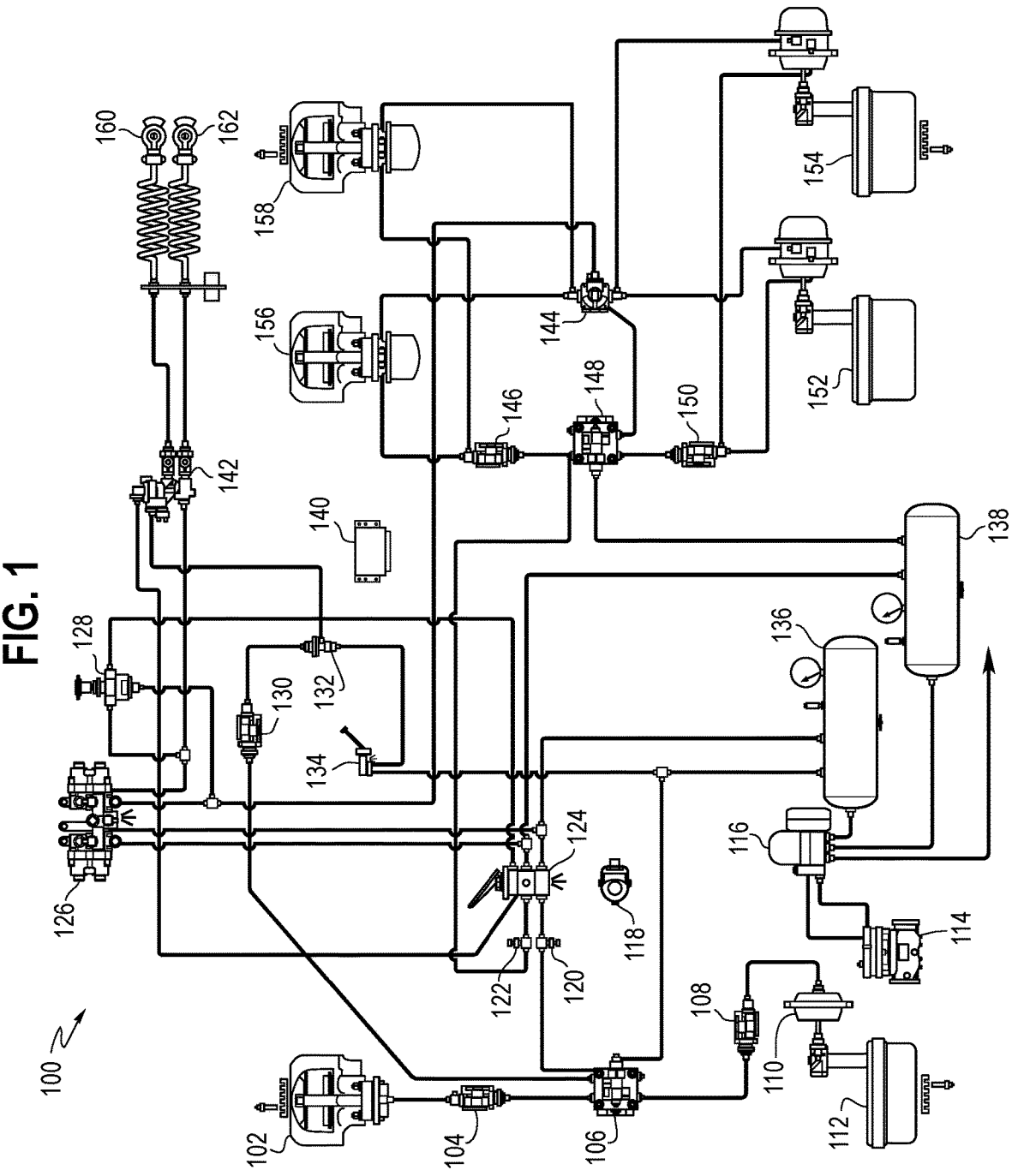
FIG. 1 is a diagram of a vehicle of an embodiment.

FIG. 1 is a diagram of a vehicle 100 (e.g., a tractor or truck) of an embodiment that is capable of towing a trailer. It should be understood that this is merely an example and that other/different components can be used. In this example, the tractor has a rear drive axle, a front undriven (steer) axle (more than one steer axle can be used), and one or more optional axles. It is important to note that while a tractor/truck is used in this example, these embodiments can also be applied in other vehicles.

As shown in FIG. 1, in this embodiment, the vehicle 100 comprises an air compressor 114, an air dryer 116, and front and rear air tanks 136, 138. The air compressor 114 provides compressed air to the air dryer 116, which supplies dried, compressed air to the front and rear air tanks 136, 138, which supply compressed air to the service brakes and the parking brakes, as discussed below. Compressed air can also be supplied to the transmission and accessories of the vehicle 100, as represented by the arrow at the bottom of FIG. 1.

Other components of the vehicle 100 include an air disc brake 102 (at a wheel end that has a wheel speed sensor), an antilock modulator 104, a traction relay valve 106, another modulator 108, a drum brake with an automatic slack adjuster and service chamber 110, 112, a steering angle sensor 118, a brake valve with a brake valve actuator 120, a pressure sensor 122, a foot brake module 124, a park valve modulator 126 having as associated park brake controller 140, a control valve 128, an antilock modulator 130, valves 132, 134, a tractor protection valve 142, a quick release valve 144, a rear axle module 148 with traction relay valves 146, 150, drum brakes 152, 154 with an automatic slack adjuster and service chamber (at least one of which is located at a wheel end with a wheel speed sensor), and air disc brakes 156, 158.

As mentioned above, the brake system of this embodiment can be used for service braking and parking the vehicle 100. In general, for service braking, when a driver presses the brake pedal of the foot brake module 124 or when a virtual driver requests braking, electronic signals representing the requested deceleration are generated to apply the appropriate amount of pressure needed to achieve that deceleration given various variables, such as, but not limited to, vehicle weight, weight distribution, whether a trailer is present, and driving conditions. Pneumatic signals for braking can be applied to the trailer via the pneumatic control and supply lines 160, 162.

The park brake controller 140 can be used in parking/unparking the vehicle. In general, a "controller" can comprise one or more processors that can execute computer-readable program code having instructions (e.g., modules, routines, sub-routine, programs, applications, etc.) that, when executed by the one or more processors, cause the one or more processors to perform certain functions, such as some or all of those discussed herein. The computer-readable program code can be stored in a non-transitory computer-readable storage medium, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof, some or all of which can be located internal to or external to the controller. The one or more processors can also take the form of a purely-hardware implementation (e.g., an application-specific integrated circuit (ASIC)).

Figure 2:
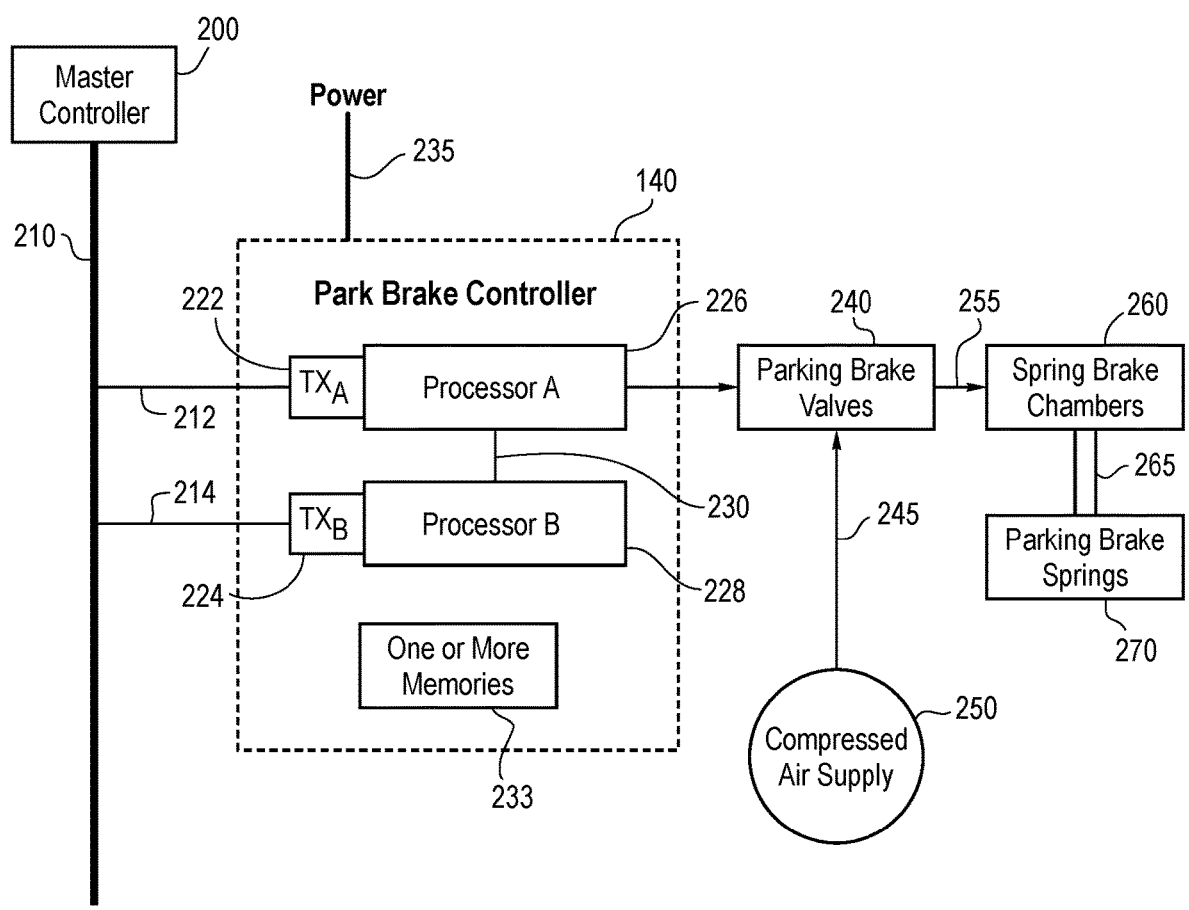
FIG. 2 is a block diagram of an example park brake controller and other components of an embodiment.

FIG. 2 is a block diagram of an example park brake controller 140 and other components of a vehicle of an embodiment. As shown in FIG. 2, the park brake controller 140 receives power from a power line 235 (power can be supplied from a battery or other power source of the vehicle). As also shown in FIG. 2, the park brake controller 140 is in communication with a master controller 200 via a communications network 210 (e.g., a controller area network (CAN)). More specifically, the park brake controller 140 communicates with the communications network 210 via first and second communication channels 212, 214. In this example, the park brake controller 140 comprises first and second processors (e.g., microcontrollers) (Processor A and Processor B) 226, 228, each associated with a transceiver ($TX_A$ and $TX_B$) 222, 224. The first transceiver 222 is coupled with the first communication channel 212, and the second transceiver 224 is coupled with the second communication channel 214. Further, the two processors 226, 228 are coupled together with a third communication channel 230, which allows the two processors 226, 228 to communicate with each other without using the communications network 210 or the first and second communication channels 212, 214.

The park brake controller 140 also comprises one or more memories 233 that can store computer-readable program code for execution by one or both of the processors 226, 228. Alternatively, some or all of the functionality of one or both of the processors 226, 228 can be implemented in hardware. So, when it is said herein that a processor is configured to perform a function, that can refer to the processor using its own hardware to perform the function and/or to the processor executing program instructions to perform the function. Also, while two processors 226, 228, transceivers 222, 225, and communication channels 212, 214 are shown in this embodiment, it should be understood that any suitable number can be used.

It should also be understood that the implementation shown in FIG. 2 is merely an example and that other implementations can be used. For example, while the park brake controller in this example has two processors (one for each transceiver), in another implementation, the park brake controller has a single processor coupled with the two transceivers or has more that one processor coupled to each transceiver. Also, more than two transceivers and/or processors can be used.

Returning to FIG. 2, the park brake controller 140 of this embodiment is used to provide a command signal to parking brake valves (e.g., solenoids) 240 to park and un-park the vehicle. In this embodiment, park brake springs 270 are used that are biased to apply pressure on braking components at the wheel ends. When the park brakes of the vehicle are applied, the park brake controller 140 provides signals to the parking brake valves 240 to exhaust air in one or more chambers of spring brake chambers 260. When air in the spring brake chambers 260 is exhausted and system air pressure drops below a threshold (e.g., to less than about 25 psi to 45 psi), the parking brake springs 270 are activated to apply the vehicle park brakes. To release the park brake, compressed air 245, 255 needs to flow from a compressed air supply 250 (e.g., the front or rear tanks 136, 138) into the spring brake chambers 260 to apply pneumatic pressure 265 to the parking brake springs 270 to release them from the braking position. This supply of compressed air is regulated by the parking brake valves 240, which is controlled by the park brake controller 140.

The park brake controller 140 can provide a command signal to parking brake valves 240 in response to human input. For example, a user input device can be provided in the cabin of the vehicle 100 to allow the driver to park/un-park the vehicle (e.g., a button can be provided on the dash that can be pulled to apply the parking brake and pushed to release the park brake). A parking request can also come from a virtual driver. As used herein, a "virtual driver" refers to an instantiation of an automated driving system that can comprise one or more processors that can execute computer-readable program code to provide fully-automatic or partially-automatic control over the acceleration, steering, and/or braking of the vehicle. A parking request from a virtual driver is sometimes referred to herein as an "external" park brake request because the request is not coming from a human driver.

There may be certain situations in which it is desired to disregard the park brake request from a human or virtual driver (e.g., when a sensor in the driver's seat does not detect the weight of a driver, when a seatbelt sensor does not detect that the seatbelt buckle is inserted into the seatbelt latch, when the vehicle is at a roll-away speed, etc.). So, in this embodiment, in addition to the park/un-park request, the master controller 200 also provides the park brake controller 140 with sensor data that it collects from at least one sensor of the vehicle. (As used herein, "sensor data" can be the raw data from the sensor or a processed version of the raw data (processed by the master controller 200 or some other component).) The park brake controller 140 can use the sensor data to determine whether or not to execute the park/un-park request from the master controller 200. For example, the park brake controller 140 can choose to ignore an un-park request if the sensor data indicates that the driver is not in the driver's seat and/or does not have his seatbelt on. As another example, the park brake controller 140 can choose to ignore a park request if the sensor data indicates that the vehicle is moving (e.g., at any speed or above a threshold speed).

Given the importance of this decision, the park brake controller 140 of this embodiment contains two processor/transceiver pairs for redundancy and to ensure that the received command/sensor data is being interpreted correctly. In operation, in this example embodiment, Transceiver A 222 receives the park brake request (e.g., a park or un-park request) and sensor data sent by the master controller 200 on the communications network 210 via the first communication channel 212. Processor A 226 analyzes the park brake request and sensor data and makes a conclusion as to whether or not the park brake request should be acted upon after the information received from Processor B 228 matches (e.g., execute the park brake request only if the sensor data indicates that the driver is in the driver seat). In parallel, Transceiver B 224 receives the same park brake request and sensor data from the communications network 210 via the second communication channel 214, and Processor B 228 analyzes the park brake request and sensor data and makes its own conclusion as to whether or not the park brake request should be executed. Processor B 228 sends its conclusion to Processor A 226 via the third communication channel 220, and Processor A 226 determines whether the two conclusions match.

Optionally, Processor A 226 can also send its conclusion to Processor B 228 via the third communication channel 220, and Processor B 228 can also determine whether the two conclusions match. If the two conclusions match, Processor B 228 can inform Processor A 226 of the agreement.

Either way, in response to the two conclusions matching, Processor A 226 will either execute the park brake request or ignore it depending on whether the conclusions match. If the conclusions do not match, the park brake request will not be executed (and/or further verification may be requested). In this implementation, Processor B 228 serves only as a plausibility/cross-check on the decision as to whether or not the park brake request should be executed, with Processor A 226 having the ability to actually execute the park brake request by supplying the appropriate a signal to the parking brake valves 240. Of course, this is just one example implementation, and other implementations can be used.

If one or both of the transceivers 222, 224 is not functioning properly, the transceiver(s) 222, 224 may not be able to read information from the communication channel(s) 212, 214 or may read the information incorrectly. As such, the desired redundancy check may not be available. The following embodiments provide fallback/fail-safe operations for the park brake controller 140 in this situation. These operations will now be described with reference to the flow chart 300 in FIG. 3.

Figure 3:
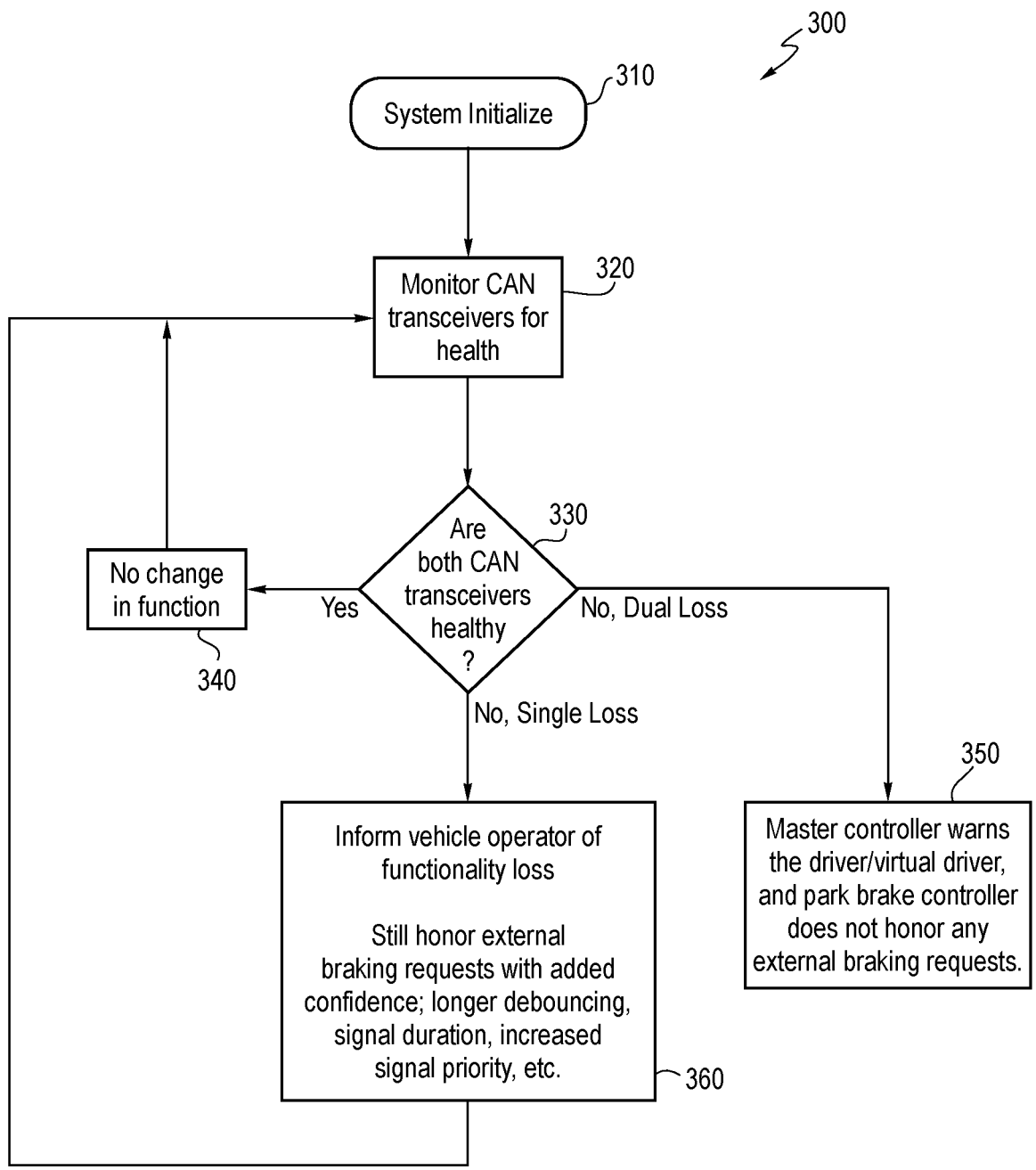
FIG. 3 is a flow chart of a method of an embodiment.

As shown in FIG. 3, after the system initializes (act 310) (e.g., either after a vehicle power-up or after a reset), the transceivers 222, 224 are monitored for health (act 320). The health of the transceivers 222, 224 can be monitored in any suitable way. For example, a diagnostic test can be performed to detect short or open circuits. In this example embodiment, data received from the communication network 210 is not used in the diagnostic check; however, in other example embodiments, data received from the communication network 210 is used in the diagnostic check. Also, while "health" is used in this example, there can be situations where the transceivers 222, 224 are not damaged but are otherwise not receiving a park brake request and sensor data (e.g., because one or both of the transceivers 222, 224 are disconnected from these communication channels 212, 214, because of a fault in the communication channels 212, 214, because of a fault in the communications network 210, because of a fault in the master controller 200, etc.). As such, the phrase "a transceiver is functional" will be used to broadly refer to the situation in which a transceiver is able to receive a park brake request and sensor data, and the phrase "a transceiver is non-functional" will be used to broadly refer to the situation in which a transceiver is unable to receive a park brake request and sensor data master controller 200, for whatever reason.

Each processor 226, 228 can send the results of its transceiver health check to the other processor 226, 228 via the third communication channel 230. If both transceivers 222, 224 are healthy, the processors 226, 228 can operate as usual (act 340). However, if one of the transceivers 222, 224 are not healthy, a failsafe operation takes place. As part of the failsafe operation in this example, if only one of the transceivers is not healthy, the processor associated with the healthy transceiver can broadcast an error state out via the healthy transceiver indicating a degradation of the redundant functionality of the park brake controller 140 (act 350). The message can, for example, cause a notification to be provided to the vehicle operator regarding the degradation of functionality. In response to this message, the human driver, if driving in hybrid mode, can bring the vehicle system into manual-only control.

Since the park brake controller 140 still has one functioning transceiver, the parking brake controller 140 can still honor park brake requests from the master controller 200 but, in this embodiment, uses a failsafe method for increased confidence. (Since only Processor A 226 is configured to execute park brake request in this embodiment, if its transceiver 222 is not functioning but Processor B's transceiver 224 is, Processor A 226 can obtain the park brake request and sensor data from the Processor B 226 via the third communication channel 230.)

These failsafe methods can compensate for the lack of signal confirmation provided for by two working transceivers 222, 224. For example, the message sent back to the master controller 200 upon detection of an unhealthy receiver can request that future park brake requests be sent with a longer signal duration (to allow the park brake controller 140 to debounce the signal for a longer duration), be sent with a priority signal to ensure they are not ignored (e.g., if the park brake controller 140 is configured to otherwise ignore park brake requests of a lower priority if one of the transceivers fails), be sent with different values of certain messages in the CAN commands, and/or be sent in a pre-defined pattern. In this way, the parking brake request and/or vehicle sensor data sent by the master controller 200 can be more robust. Additionally or alternatively, the park brake controller 140 can implement its own failsafe operations to provide additional confidence. For example, the park brake controller 140 can provide longer debouncing to ensure that the longer signal received form the master controller 200 is interpreted correctly (e.g., by analyzing six message cycles instead of three message cycles before acting on the park brake request). These failsafe methods can provide a higher degree of confidence and allow the park brake controller 104 to continue operating as normal.

Referring back to the flow chart 300, if both transceivers 222, 224 are not healthy, the master controller 200 can detect an absence of "heartbeat" signals from the transceivers 222, 224 and warn the human or virtual driver of a problem (act 350). Also, to the extent that any stray signals are provided to the processors 226, 228 by the non-functioning transceivers 222, 226, those signals can be ignored so as to not misinterpret them as a parking brake request. In addition, the park brake controller 140 will not honor any external brake request due to both transceivers 222, 226 non-functioning.

In the embodiments of the present invention described above, overloading of CAN channels 212, 214 will not occur, even in the event of failure, because both channels 212, 214 are used by default, and redundancy in communication ensures system safety.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A park brake controller comprising:
a first transceiver that, when functional, is configured to receive, via a first communication channel coupled with a communication network, a park brake request and sensor data from at least one sensor of a vehicle;
a second transceiver that, when functional, is configured to receive, via a second communication channel coupled with the communication network, the park brake request and the sensor data; and
first and second processors respectively coupled with the first and second transceivers;
wherein:
when the first and second transceivers are functional, the first and second processors are configured to independently confirm whether the park brake request should be executed based on the sensor data; and
when only one of the first and second transceivers is functional, a one of the first and second processors associated with the functional transceiver is configured to perform a failsafe operation to increase confidence in its decision as to whether the park brake request should be executed based on the sensor data.

2. The park brake controller of claim 1, wherein:
when neither the first transceiver nor the second transceiver is functional, the first and second processors are further configured to avoid executing the park brake request.

3. The park brake controller of claim 1, wherein the failsafe operation comprises sending, via the functional transceiver, an error message to a controller in the vehicle.

4. The park brake controller of claim 1, wherein the failsafe operation comprises sending, via the functional transceiver, a request to a controller in the vehicle that future park brake requests be sent with a signal having a longer duration.

5. The park brake controller of claim 4, wherein the one of the first and second processors associated with the functional transceiver is further configured to debounce the signal for the longer duration.

6. The park brake controller of claim 1, wherein the failsafe operation comprises sending, via the functional transceiver, a request to a controller in the vehicle that future park brake requests be sent with a priority indication.

7. The park brake controller of claim 1, wherein the failsafe operation comprises sending, via the functional transceiver, a request to a controller in the vehicle that future park brake requests be sent with different message values.

8. The park brake controller of claim 1, wherein the failsafe operation comprises sending, via the functional transceiver, a request to a controller in the vehicle that future park brake requests be sent in a predefined pattern.

9. The park brake controller of claim 1, wherein the first and second transceivers are functional when the first and second transceivers pass a health check at one of a power-up and after a reset.

10. The park brake controller of claim 1, wherein the first and second transceivers are functional when the first and second transceivers are able to receive the park brake request and the sensor data.

11. The park brake controller of claim 1, further comprising a third communication channel coupling the first and second processors, wherein the first and second processors are further configured to use the third communication channel to communicate their respective decisions to each other as to whether the park brake request should be executed based on the sensor data.

12. The park brake controller of claim 1, wherein the first processor, but not the second processor, is configured to execute the park brake request by sending a control signal to a parking brake valve.

13. A park brake controller comprising:
a plurality of transceivers;
at least one processor coupled with the plurality of transceivers;
a non-transitory computer-readable medium; and
program instructions stored on the non-transitory computer-readable medium that, when executed by the at least one processor, cause the at least one processor to:
in response to at least one of the plurality of transceivers not being able to receive, from a communication network in a vehicle, a park brake request and vehicle sensor data, cause the park brake request and vehicle sensor data to be received in a different form by another one of the plurality of transceivers.

14. The park brake controller of claim 13, wherein the different form comprises a signal with a longer duration.

15. The park brake controller of claim 14, wherein the program instructions, when executed by the at least one processor, further cause the at least one processor to debounce the signal for the longer duration.

16. The park brake controller of claim 13, wherein the different form comprises an inclusion of a different priority indicator.

17. The park brake controller of claim 13, wherein the different form comprises different message values.

18. The park brake controller of claim 13, wherein the different form comprises a predefined pattern.

19. A method comprising:
performing in a park brake controller comprising first and second transceivers:
determining that the first transceiver is not functional;
in response to determining that the first transceiver is not functional, causing an increase in robustness of a park brake request and vehicle sensor data received by the second transceiver; and
determining whether or not to execute the park brake request based on the vehicle sensor data.

20. The method of claim 19, wherein the park brake controller causes the increase in robustness by requesting that the park brake request and/or vehicle sensor data be sent: with a longer duration, with a priority indicator, with a predetermined message value, and/or with a predefined pattern.

* * * * *